United States Patent
Wang et al.

(10) Patent No.: US 11,237,657 B2
(45) Date of Patent: Feb. 1, 2022

(54) ARRAY SUBSTRATE, METHOD OF MANUFACTURING ARRAY SUBSTRATE, DISPLAY PANEL AND DISPLAY APPARATUS

(71) Applicants: ORDOS YUANSHENG OPTOELECTRONICS CO., LTD., Ordos (CN); BOE TECHNOLOGY GROUP CO., LTD., Beijing (CN)

(72) Inventors: Chenglong Wang, Beijing (CN); Yezhou Fang, Beijing (CN); Feng Li, Beijing (CN); Xinguo Wu, Beijing (CN); Xiaogang Zhu, Beijing (CN); Guojiang Yu, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/823,603

(22) Filed: Mar. 19, 2020

(65) Prior Publication Data
US 2021/0089154 A1 Mar. 25, 2021

(30) Foreign Application Priority Data
Sep. 25, 2019 (CN) .......................... 201910911532.3

(51) Int. Cl.
*G06F 3/041* (2006.01)
*G02F 1/1333* (2006.01)

(52) U.S. Cl.
CPC ........ *G06F 3/0412* (2013.01); *G02F 1/13338* (2013.01); *G02F 1/133357* (2021.01); *G06F 2203/04103* (2013.01)

(58) Field of Classification Search
CPC ......... G06F 3/0412; G06F 2203/04103; G06F 3/047; G06F 3/044; G06F 3/04164; G06F 3/0445; G02F 1/13338; G02F 1/133357; H01L 29/6675
See application file for complete search history.

(56) References Cited

U.S. PATENT DOCUMENTS

| | | | |
|---|---|---|---|
| 2013/0050126 A1* | 2/2013 | Kimura | G06F 3/0445 345/173 |
| 2016/0246427 A1* | 8/2016 | Ming | G06F 3/044 |
| 2016/0379997 A1* | 12/2016 | Jo | G06F 3/04164 257/72 |
| 2018/0166473 A1* | 6/2018 | Xu | H01L 29/6675 |
| 2021/0019007 A1* | 1/2021 | Park | G06F 3/047 |

* cited by examiner

*Primary Examiner* — Richard J Hong
(74) *Attorney, Agent, or Firm* — Kinney & Lange, P.A.

(57) ABSTRACT

Embodiments of the present disclosure provide an array substrate, a method of manufacturing the array substrate, a display panel and a display apparatus. The array substrate includes: a substrate; a touch pad disposed on a side of the substrate; a first planarization layer disposed on a side of the touch pad facing away from the substrate; a first passivation layer disposed on a side of the first planarization layer facing away from the touch pad; a touch electrode layer disposed on a side of the first passivation layer facing away from the first planarization layer; and a first via hole sequentially passing through at least the first planarization layer and the first passivation layer. The touch electrode layer is electrically connected to the touch pad through the first via hole.

18 Claims, 4 Drawing Sheets

ARRAY SUBSTRATE, METHOD OF MANUFACTURING ARRAY SUBSTRATE, DISPLAY PANEL AND DISPLAY APPARATUS

CROSS-REFERENCE TO RELATED APPLICATION

This application claims priority to Chinese Patent Application No. 201910911532.3, filed on Sep. 25, 2019, entitled "ARRAY SUBSTRATE, METHOD OF MANUFACTURING ARRAY SUBSTRATE, DISPLAY PANEL AND DISPLAY APPARATUS", which is incorporated herein by reference in its entirety.

TECHNICAL FIELD

Embodiments of the present disclosure relate to the field of display technology, and particularly to an array substrate, a method of manufacturing the array substrate, a display panel and a display apparatus.

BACKGROUND

For example, in a low-temperature polysilicon liquid crystal display (LTPS LCD), a touch electrode or the like may be integrated in an array substrate of the liquid crystal display. Therefore, a touch display panel including the array substrate is relatively light and thin.

SUMMARY

In an aspect of the present disclosure, embodiments of the present disclosure provide an array substrate including: a substrate; a touch pad disposed on a side of the substrate; a first planarization layer disposed on a side of the touch pad facing away from the substrate; a first passivation layer disposed on a side of the first planarization layer facing away from the touch pad; a touch electrode layer disposed on a side of the first passivation layer facing away from the first planarization layer; and a first via hole sequentially passing through at least the first planarization layer and the first passivation layer, wherein the touch electrode layer is electrically connected to the touch pad through the first via hole.

According to embodiments of the present disclosure, the array substrate further includes: a pixel electrode layer disposed between the first planarization layer and the first passivation layer, and including a plurality of sub-pixel electrodes arranged in an array, the first via hole sequentially passing through the first planarization layer, the pixel electrode layer, and the first passivation layer, wherein the touch electrode layer includes a plurality of touch electrodes arranged in an array, and orthogonal projections of the touch electrodes on the substrate at most partially coincide with orthogonal projections of the sub-pixel electrodes on the substrate.

According to embodiments of the present disclosure, the array substrate further includes: a source and drain electrode layer disposed in a same layer as the touch pad and including a source and drain electrode pad; a second via hole passing through the first planarization layer; and a pixel electrode layer disposed between the first planarization layer and the first passivation layer, and electrically connected to the source and drain electrode pad of the source and drain electrode layer through the second via hole.

According to embodiments of the present disclosure, the array substrate further includes: a source and drain electrode layer disposed on a side of the substrate; a second planarization layer disposed on a side of the source and drain electrode layer facing away from the substrate; and a second passivation layer disposed on a side of the second planarization layer facing away from the source and drain electrode layer, wherein the touch pad is disposed on a side of the second passivation layer facing away from the second planarization layer.

According to embodiments of the present disclosure, the array substrate further includes: a second via hole sequentially passing through the second planarization layer, the second passivation layer, and the first planarization layer; and a pixel electrode layer disposed between the first planarization layer and the first passivation layer, wherein the source and drain electrode layer includes a source and drain electrode pad, and the pixel electrode layer is electrically connected to the source and drain electrode pad of the source and drain electrode layer through the second via hole.

According to embodiments of the present disclosure, the substrate includes: a base plate; a buffer layer disposed on a side of the base plate; an active layer disposed on a side of the buffer layer facing away from the base plate, wherein an orthogonal projection of the active layer on the base plate covers a part of a surface of the base plate, and a material of which the active layer is formed includes a low-temperature polysilicon; a gate insulating layer disposed on a side of the active layer facing away from the buffer layer; a gate electrode disposed on a side of the gate insulating layer facing away from the active layer, wherein an orthogonal projection of the gate electrode on the base plate is located within an orthogonal projection of the active layer on the base plate; and an interlayer insulating layer disposed on a side of the gate electrode facing away from the gate insulating layer, the array substrate further includes: a source and drain electrode layer disposed on a side of the interlayer insulating layer facing away from the gate electrode, wherein the source and drain electrode layer is electrically connected to the active layer through a third via hole.

According to embodiments of the present disclosure, the touch pad is disposed in a same layer as the source and drain electrode layer, or the touch pad is disposed on a side of the source and drain electrode layer facing away from the interlayer insulating layer.

According to embodiments of the present disclosure, the first planarization layer includes an organic material layer, and the first passivation layer includes an inorganic material layer.

According to embodiments of the present disclosure, the touch pad has a recess on a surface of the touch pad facing towards the touch electrode layer, during forming a portion, in the first passivation layer, of the first via hole by a dry etching process, the recess is formed by etching a portion, corresponding in position to the first via hole, of the surface of the touch pad by means of an etching gas, and at least a portion of an orthogonal projection of the recess on the substrate is located within an orthogonal projection of the first via hole on the substrate.

In another aspect of the present disclosure, embodiments of the present disclosure provide a method of manufacturing an array substrate, the method including: providing a substrate; forming a touch pad on a side of the substrate; forming a first planarization layer on a side of the touch pad facing away from the substrate; forming a first passivation layer on a side of the first planarization layer facing away from the touch pad; and forming a touch electrode layer on a side of the first passivation layer facing away from the first planarization layer, wherein the touch electrode layer is electrically connected to the touch pad through a first via hole passing through at least the first planarization layer and the first passivation layer.

According to embodiments of the present disclosure, the method further includes: forming a pixel electrode layer subsequent to forming the first planarization layer on the side of the touch pad and prior to forming the first passivation layer on the side of the first planarization layer, wherein the first via hole includes a first hole passing through the first planarization layer, a second hole passing through the pixel electrode layer, and a third hole passing through the first passivation layer, which are arranged in sequence.

According to embodiments of the present disclosure, forming the first passivation layer on the side of the first planarization layer includes: subsequent to forming the first planarization layer with the first hole, and the pixel electrode layer with the second hole, depositing a first passivation layer material on a side of the pixel electrode layer facing away from the first planarization layer, and performing a first dry etching process on the first passivation layer material to form the third hole in the first passivation layer material; and while performing the first dry etching process on the first passivation layer material, etching a portion, corresponding in position to the third hole, of a surface of the touch pad facing away from the substrate so as to remove an oxide layer of the portion of the surface of the touch pad.

According to embodiments of the present disclosure, forming the first planarization layer on the side of the touch pad includes: applying a planarization resin on the side of the touch pad facing away from the substrate; exposing, by means of a mask, the planarization resin to cure the planarization resin, an orthogonal projection of the mask on the substrate being located within an orthogonal projection of the touch pad on the substrate; and removing a portion of the planarization resin not covered by the mask to form the first hole, thereby forming the first planarization layer with the first hole on the side of the touch pad facing away from the substrate.

According to embodiments of the present disclosure, forming the first passivation layer on the side of the first planarization layer includes: depositing a first passivation layer material on a side of the pixel electrode layer facing away from the first planarization layer; applying a photoresist on a surface of the first passivation layer material facing away from the first planarization layer, and exposing the photoresist to form a patterned photoresist layer, the photoresist layer having a hollowed-out region, and an orthogonal projection of the hollowed-out region on the substrate being located within an orthogonal projection of the first hole on the substrate; performing a first dry etching process on a portion of the first passivation layer material corresponding in position to the hollowed-out region to form the third hole in the first passivation layer material; and stripping the photoresist layer.

According to embodiments of the present disclosure, while performing the first dry etching process on the portion of the first passivation layer material corresponding in position to the hollowed-out region, a portion, corresponding in position to the third hole, of a surface of the touch pad facing away from the substrate is etched with an etching gas so as to remove an oxide layer of the portion of the surface of the touch pad.

According to embodiments of the present disclosure, the method further includes: forming a source and drain electrode layer while forming the touch pad on the side of the substrate, the source and drain electrode layer being disposed in a same layer as the touch pad and including a source and drain electrode pad, wherein the orthogonal projection of the mask on the substrate is located within an orthogonal projection constituted by both the orthogonal projection of the touch pad on the substrate and an orthogonal projection of the source and drain electrode pad on the substrate, and wherein a second via hole is formed while removing the portion of the planarization resin not covered by the mask to form the first hole, thereby forming the first planarization layer with the first hole and the second via hole on the side of the touch pad facing away from the substrate, wherein the pixel electrode layer is electrically connected to the source and drain electrode pad of the source and drain electrode layer through the second via hole.

According to embodiments of the present disclosure, the method further includes: prior to forming the touch pad, forming, on the side of the substrate, a source and drain electrode layer including a source and drain electrode pad; forming a second planarization layer on a side of the source and drain electrode layer facing away from the substrate; and forming a second passivation layer on a side of the second planarization layer facing away from the substrate, wherein the touch pad is formed on a side of the second passivation layer facing away from the second planarization layer, wherein the pixel electrode layer is electrically connected to the source and drain electrode pad of the source and drain electrode layer through a second via hole, the second via hole including: a fourth hole passing through the second planarization layer, a fifth hole passing through the second passivation layer, and a sixth hole passing through the first planarization layer, which are arranged in sequence; and wherein the fifth hole is formed by performing a second dry etching process on a second passivation layer material deposited on the side of the second planarization layer facing away from the source and drain electrode layer, and meanwhile a portion, corresponding in position to the fifth hole, of a surface of the source and drain electrode pad facing away from the substrate is etched with an etching gas of the second dry etching process so as to remove an oxide layer of the portion of the surface of the source and drain electrode pad.

According to embodiments of the present disclosure, the method further includes: forming a pixel electrode layer subsequent to forming the first planarization layer on the side of the touch pad and prior to forming the first passivation layer on the side of the first planarization layer, wherein the formed pixel electrode layer includes a plurality of sub-pixel electrodes arranged in an array, wherein forming the touch electrode layer on the side of the first passivation layer includes: depositing an electrode material on the side of the first passivation layer facing away from the pixel electrode layer, and patterning the deposited electrode material to form a plurality of touch electrodes arranged in an array, wherein orthogonal projections of the touch electrodes on the substrate at most partially coincide with orthogonal projections of the sub-pixel electrodes on the substrate.

In another aspect of the present disclosure, embodiments of the present disclosure provide a display panel. The display panel includes: the above array substrate, or the array substrate manufactured by the above method.

In still another aspect of the present disclosure, embodiments of the present disclosure provide a display apparatus including the above display panel.

BRIEF DESCRIPTION OF THE DRAWINGS

The above and/or additional aspects and advantages of the present disclosure will be apparent and more readily appreciated from the following description of embodiments taken in conjunction with the accompanying drawings, in which.

DETAILED DESCRIPTION

Figure 1:
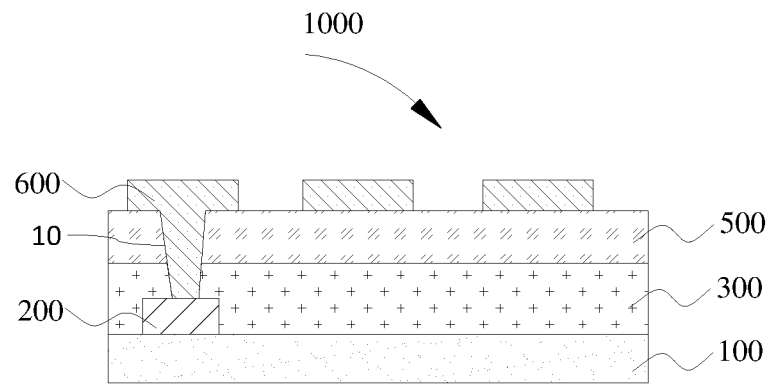
FIG. 1 is a schematic view showing a structure of an array substrate according to an embodiment of the present disclosure.

Reference will now be made in detail to the embodiments of the present disclosure, examples of which are illustrated in the accompanying drawings. Identical or similar reference numerals refer to identical or similar elements or elements having identical or similar function throughout. The embodiments described below with reference to the accompany drawings are illustrative, are only used to explain the present disclosure, and should not be construed to limit the present disclosure.

In an aspect of the present disclosure, embodiments of the present disclosure provide an array substrate. According to embodiments of the present disclosure, the array substrate may be applied to the touch display panel. Referring to FIG. 1, the array substrate 1000 includes: a substrate 100, a touch pad 200, a first planarization layer 300, a first passivation layer 500, a touch electrode 600 and a first via hole 10. The touch pad 200 is disposed on a side of the substrate 100, the first planarization layer 300 is disposed on a side of the touch pad 200 facing away from the substrate 100, the first passivation layer 500 is disposed on a side of the first planarization layer 300 facing away from the touch pad 200, the touch electrode layer 600 is disposed on a side of the first passivation layer 500 facing away from the first planarization layer 300, the first via hole 10 sequentially passes through at least the first planarization layer 300 and the first passivation layer 500, and the touch electrode layer 600 is electrically connected to the touch pad 200 through the first via hole 10. The first planarization layer 300 may be an organic material layer, and the first planarization layer 500 may be an inorganic material layer. For example, the first planarization layer 500 may be a silicon nitride layer or the like. The touch pad 200 has a recess 201 (as shown in FIGS. 3-7) formed on a surface of the touch pad 200 facing towards the touch electrode layer 600. During forming a portion, in the first passivation layer 500, of the first via hole 10 by a dry etching process, the recess 201 is formed by etching a portion, corresponding in position to the first via hole 10, of the surface of the touch pad 200 facing towards the touch electrode layer with an etching gas. At least a portion of an orthogonal projection of the recess 201 on the substrate 100 is located within an orthogonal projection of the first via hole 10 on the substrate 100. The recess 201 has a small depth. The depth of the recess 201 is equal to a thickness of a removed metal oxide layer of the portion, corresponding in position to the first via hole 10, of the surface of the touch pad 200. Thereby, in the array substrate 1000, while the portion of the first via hole 10 is formed in the first passivation layer 500 by etching, the metal oxide layer of the portion, corresponding in position to the first via hole 10, of the surface of the touch pad 200 facing away from the substrate 100 can be removed by etching, which can thus reduce the contact resistance between the touch electrode layer 600 and the touch pad 200, decrease the poor touch of a touch display panel with the array substrate 1000, and improve the service performance of the touch display panel.

Figure 3:
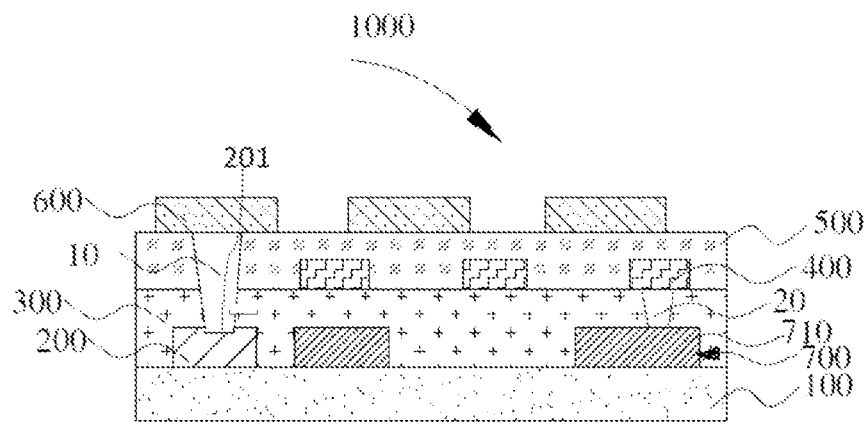
FIG. 3 is a schematic view showing a structure of an array substrate according to another embodiment of the present disclosure.

According to embodiments of the present disclosure, referring to FIG. 3, the array substrate 1000 may further include a pixel electrode layer 400, a second via hole 20, and a source and drain electrode layer 700. The pixel electrode layer 400 is disposed between the first planarization layer 300 and the first passivation layer 500, the source and drain electrode layer 700 may be disposed in a same layer as the touch pad 200 and may include a data line and a source and drain electrode pad 710, the pixel electrode layer 400 is electrically connected to the source and drain electrode pad 710 of the source and drain electrode layer 700 through the second via hole 20, and the second via hole 20 passes through the first planarization layer 300. Thereby, the service performance of the array substrate is further improved. In addition, referring to FIG. 3, the touch electrode layer 600 is electrically connected to the touch pad 200 through the first via hole 10, and the first via hole 10 sequentially passes through the first planarization layer 300, the pixel electrode layer 400, and the first passivation layer 500. Thereby, the service performance of the array substrate 1000 is further improved. It is to be noted that the first via hole 10 passing through the pixel electrode layer 400 refers to the first via hole 10 passing through a metal layer where the pixel electrode layer 400 is located. Specifically, the pixel electrode layer 400 may have an opening in a position corresponding to the first via hole 10. In other words, the pixel electrode layer 400 may be provided with no metal for the pixel electrode in the position corresponding to the first via hole 10. In this case, the first via hole passes through the first planarization layer 300 and the first passivation layer 500.

It is to be noted that in order to illustrate the first via hole 10 and the second via hole 20 more clearly, metal conducting wires filled in the first via hole 10 and the second via hole 20 are not shown in FIGS. 2-7 of the present disclosure. It would be appreciated by those skilled in the art that in an actual array substrate, both the first via hole 10 and the second via hole 20 are filled with the metal conducting wires for electrical connections between the touch electrode layer 600 and the touch pad 200 and between the pixel electrode layer 400 and the source and drain electrode pad 710.

For ease of understanding, the principle in which the array substrate according to the embodiments of the present disclosure can achieve the above beneficial effects will be briefly described below.

In the array substrate for the touch display panel manufactured by the existing method, since the contact resistance between the touch electrode and the touch pad is large, the poor touch is easily generated, which affects the service performance of the touch display panel with the array substrate. Specifically, referring to FIG. 2, in the array substrate for the touch display panel manufactured by the existing method, the touch electrode layer 600 and the touch pad 200 are electrically connected to each other through the first via hole 10 that passes through the first planarization layer 300, and the pixel electrode layer 400 and the source and drain electrode pad 710 are electrically connected to each other through the second via hole 20 that sequentially passes through the first planarization layer 300, the touch electrode layer 600 and the first passivation layer 500. Generally the portion, corresponding in position to the first via hole 10, of the surface of the touch pad 200 facing away from the substrate 100 has the metal oxide layer. The metal oxide layer will increase the contact resistance between the touch electrode layer 600 and the touch pad 200 (for example, it was found by testing that the contact resistance between the touch electrode and the touch pad reaches 200 ohm at a current of 2-9 mA in the array substrate manufactured by the existing method). When a touch signal is fed into the touch electrode layer 600 through the touch pad 200, the touch electrode layer 600 is insufficiently charged. Thereby, the poor touch is easily generated, which affects the service performance of the touch display panel with the array substrate. If a separate etching process is used to remove the metal oxide layer of the portion, corresponding in position to the first via hole 10, of the surface of the touch pad 200 facing away from the substrate 100, the number of production steps and the production cost will be increased.

Figure 2:
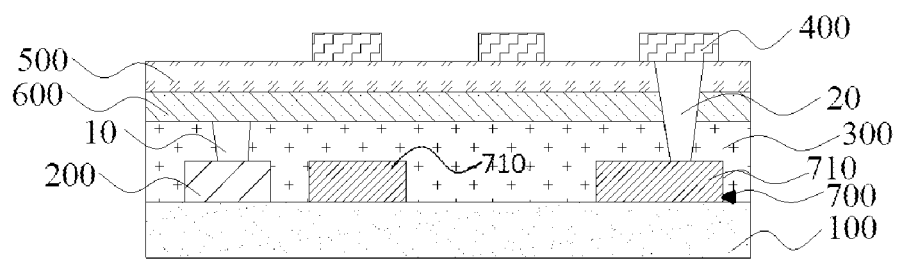
FIG. 2 is a schematic view showing a structure of an array substrate in related art.

In addition, referring to FIG. 2, in the existing method of manufacturing the array substrate, when the first via hole 10 between the touch electrode layer 600 and the touch pad 200 is formed, the first via hole 10 passes through only the first planarization layer 300. Generally a material for forming the first planarization layer 300 is an organic material such as acrylic resin. Therefore, generally a mask is used to form the first planarization layer 300 with the first via hole 10 (without needing an etching process for forming the first via hole 10). Therefore, in the existing manufacturing process, if the separate etching process is not added, it is impossible to remove the metal oxide layer of the portion, corresponding in position to the first via hole 10, of the surface of the touch pad 200 facing away from the substrate 100, by etching the metal oxide layer. However, when the second via hole 20 between the pixel electrode layer 400 and the source and drain electrode pad 710 is formed by the existing method, the second via hole 20 sequentially passes through the first planarization layer 300, the touch electrode layer 600 and the first passivation layer 500. Generally the first passivation layer 500 is formed of an inorganic material such as silicon nitride. Therefore, in the existing manufacturing process, when a portion of the second via hole 20 passing through the first passivation layer is formed in the first passivation layer 500, it is necessary to perform a dry etching process on the deposited inorganic material so as to form the portion of the second via hole 20. For example, it is necessary to etch the deposited inorganic material by plasma gas so as to form the portion of the second via hole 20. In the etching process, the etching gas can diffuse along the second via hole 20, and thus can etch a portion, corresponding in position to the second via hole 20, of the surface of the source and drain electrode pad 710 facing away from the substrate 100. For example, the etching gas can remove the metal oxide layer and the like of the portion of the surface of the source and drain electrode pad 710 by etching the metal oxide layer and the like. Through in-depth research and a large number of experiments, the inventor found that because the number of touch electrodes electrically connected to the touch pad 200 is relatively small (for example, one touch pad is electrically connected to several hundred touch electrodes), the metal oxide layer of the portion, corresponding in position to the first via hole 10, of the surface of the touch pad 200 facing away from the substrate 100 will significantly increase the contact resistance between each touch electrode and the touch pad 200, and will result in problems such as an occurrence of the poor touch of the display panel with the array substrate, severely affecting the touch performance of the touch display panel. Because the number of the pixel electrodes electrically connected to the source and drain electrode pad 710 is relatively large (for example, one source and drain electrode pad is electrically connected to tens of thousands of pixel electrodes), the metal oxide layer of the portion, corresponding in position to the second via hole 20, of the surface of the source and drain electrode pad 710 facing away from the substrate 100 has a small or even negligible effect on each pixel electrode.

Therefore, in the array substrate according to the embodiments of the present disclosure, a position of the touch electrode layer and a position of the pixel electrode layer are exchanged. In other words, as shown in FIGS. 1 and 3, the pixel electrode layer 400 is disposed on the side of the first planarization layer 300 facing away from the substrate 100, and the touch electrode layer 600 is disposed on the side of the first passivation layer 500 facing away from the pixel electrode layer 400. The touch electrode layer 600 and the touch pad 200 are electrically connected to each other through the first via hole 10 that sequentially passes through the first planarization layer 300, the pixel electrode layer 400 and the first passivation layer 500, and the pixel electrode layer 400 and the source and drain electrode pad 710 are electrically connected to each other through the second via hole 20 that passes through the first planarization layer 300. Therefore, when the first passivation layer 500 with the portion of the first via hole 10 is formed, the dry etching process may be performed on the first passivation layer 500. In the dry etching process, the metal oxide layer of the portion, corresponding in position to the first via hole 10, of the surface of the touch pad 200 facing away from the substrate 100 can be removed by etching the metal oxide layer with the etching gas along the first via hole 10, which can thus reduce the contact resistance between the touch electrode layer 600 and the touch pad 200 (for example, it was found by testing that the contact resistance between the touch electrode and the touch pad is reduced to 40 ohm at a current of 2-9 mA in the array substrate according to the embodiment of the present disclosure), decrease the poor touch of a touch display panel with the array substrate 1000, and improve the service performance of the touch display panel. In addition, in the method, only the position where the etching process is performed in the existing manufacturing process is adjusted (for example, the existing position of the via hole formed by etching in the first passivation layer 500 is adjusted), without increasing the number of the production steps and the production cost.

In summary, with the array substrate according to the embodiment of the present disclosure, the contact resistance between the touch electrode and the touch pad, and the poor touch can be reduced without increasing the production steps and the production cost, thereby facilitating a mass production.

Figure 4:
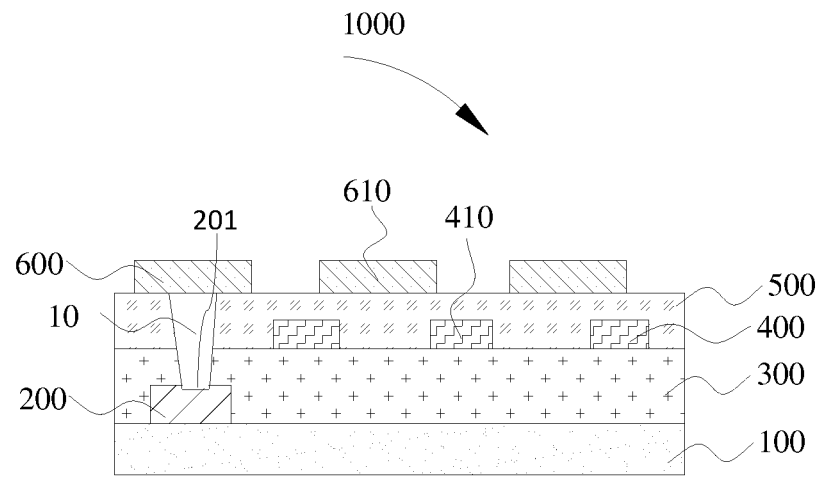
FIG. 4 is a schematic view showing a structure of an array substrate according to still another embodiment of the present disclosure.

According to embodiments of the present disclosure, referring to FIG. 4, the pixel electrode layer 400 may include a plurality of sub-pixel electrodes 410 arranged in an array and configured to control deflections of liquid crystal molecules in the plurality of sub-pixel regions, respectively. Specifically, the touch electrode layer 600 may also include a plurality of touch electrodes 610 arranged in an array, and orthogonal projections of the touch electrodes 610 on the substrate 100 at most partially coincide with orthogonal projections of the sub-pixel electrodes 410 on the substrate 100. In other words, the orthogonal projections of the touch electrodes 610 on the substrate 100 partially coincide with the orthogonal projections of the sub-pixel electrodes 410 on the substrate 100, or the orthogonal projections of the touch electrodes 610 on the substrate 100 are outside the orthogonal projections of the sub-pixel electrodes 410 on the substrate 100. As described above, referring to FIG. 2, in the existing array substrate for the touch display panel, the touch electrode layer 600 is usually a whole layer of metal. There is a large area of overlap between an orthographic projection of the touch electrode layer 600 on the substrate 100 and an orthographic projection of the pixel electrode layer 400 on the substrate 100. When the array substrate is used for a touch display panel, the aperture ratio and light transmittance of the touch display panel will be affected. However, in the array substrate 1000 according to the embodiments of the present disclosure, referring to FIG. 4, the pixel electrode layer 400 is disposed on a side of the touch electrode layer 600 facing towards the substrate 100. When the array substrate is used in a display panel, liquid crystal molecules are disposed on a side of the touch electrode layer 600 facing away from the substrate 100. Therefore, in order that the pixel electrode layer 400 can control deflections of liquid crystal molecules better, slits are formed in the touch electrode layer. In other words, as shown in FIG. 4, the touch electrode layer 600 may include a plurality of touch electrodes 610 arranged in an array, and orthogonal projections of the touch electrodes 610 on the substrate 100 at most partially coincide with orthogonal projections of the sub-pixel electrodes 410 on the substrate 100. In other words, the orthogonal projections of the touch electrodes 610 on the substrate 100 and the orthogonal projections of the sub-pixel electrodes 410 on the substrate 100 partially coincide with each other or do not coincide with each other at all. Thereby, the pixel electrodes 610 corresponding in position to the slits can control the deflections of the liquid crystal molecules better, and there is a small area of overlap between an orthographic projection of the touch electrode layer 600 on the substrate 100 and an orthographic projection of the pixel electrode layer 400 on the substrate 100. When the array substrate 1000 is used for a touch display panel, the aperture ratio, the light transmittance, and the display performance of the touch display panel can be improved.

It is to be noted that the touch electrode may be a transparent electrode, such as a transparent electrode of indium tin oxide (ITO), and the transparent electrode may be used as a common electrode and a touch electrode in a time-sharing manner. In a display phase, a common voltage signal can be provided to the transparent electrode, and the transparent electrode can be used as the common electrode. In a touch phase, a touch driving signal can be applied to the transparent electrode through the touch pad, and a touch feedback signal can be received to recognize a touch position. In other words, in this phase, the transparent electrode is used as the touch electrode. Specifically, generally within each frame time, several milliseconds are used for transmitting the touch signal, and most of the rest is used for displaying.

Figure 5:
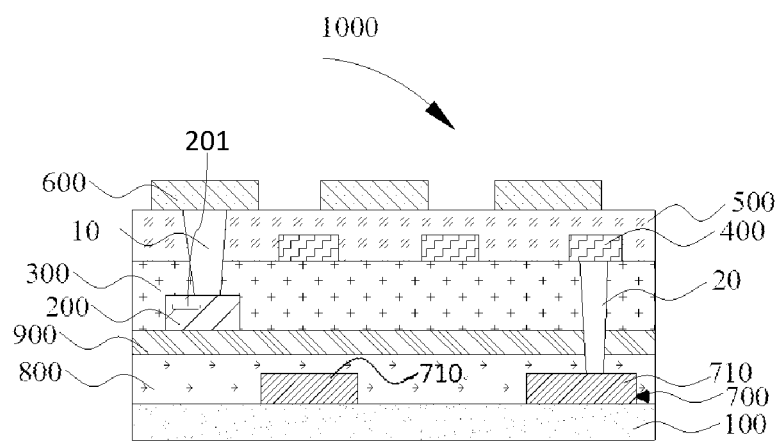
FIG. 5 is a schematic view showing a structure of an array substrate according to still yet another embodiment of the present disclosure.
Figure 6:
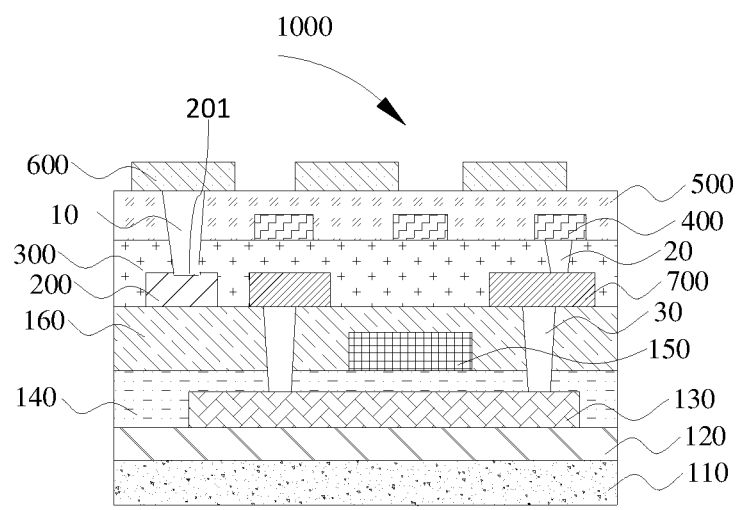
FIG. 6 is a schematic view showing a structure of an array substrate according to an embodiment of the present disclosure, the array substrate corresponding to that shown in FIG. 3, and having a specific substrate.
Figure 7:
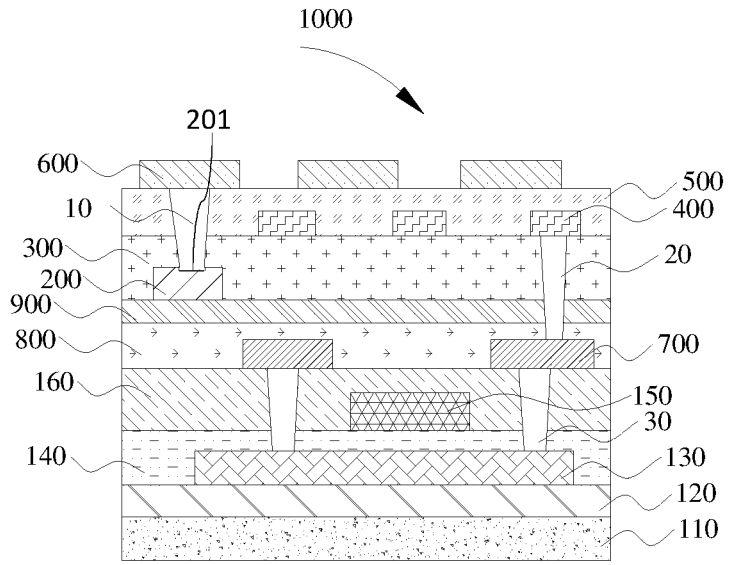
FIG. 7 is a schematic view showing a structure of an array substrate according to another embodiment of the present disclosure, the array substrate corresponding to that shown in FIG. 5, and having a specific substrate.

According to embodiments of the present disclosure, referring to FIGS. 3 and 5, the source and drain electrode layer 700 and the touch pad 200 may be disposed in a same layer (referring to FIG. 3) or in different layers. Specifically, referring to FIG. 5, the source and drain electrode layer 700 may be disposed on a side of the substrate 100, the array substrate 1000 may further include a second planarization layer 800 and a second passivation layer 900, the second planarization layer 800 may be disposed on a side of the source and drain electrode layer 700 facing away from the substrate 100, the second passivation layer 900 may be disposed on a side of the second planarization layer 800 facing away from the source and drain electrode layer 700, and the touch pad 200 is disposed on a side of the second passivation layer 900 facing away from the second planarization layer 800. In other words, the touch pad 200 may be separately disposed in a layer. Specifically, the pixel electrode layer 400 is electrically connected to the source and drain electrode pad 710 of the source and drain electrode layer 700 through the second via hole 20, and the second via hole 20 sequentially passes through the second planarization layer 800, the second passivation layer 900 and the first planarization layer 300. Thereby, in the present embodiment, a portion of the second via hole 20 is formed in the second passivation layer 900 by a dry etching process. In the dry etching process, the etching gas can diffuse along the second via hole 20, and thus can etch a portion, corresponding in position to the second via hole 20, of the surface of the source and drain electrode pad 710 facing away from the substrate 100, so as to remove the oxide layer of the portion of the surface of the source and drain electrode pad 710 facing away from the substrate 100, further improving the service performance of the array substrate 1000.

According to embodiments of the present disclosure, the specific type of the substrate 100 is not particularly limited. For example, the substrate 100 may include a multilayer structure. Specifically, referring to FIGS. 6 and 7, the substrate 100 may include: a base plate 110, a buffer layer 120, an active layer 130, a gate insulating layer 140, a gate electrode 150, and an interlayer insulating layer 160. The buffer layer 120 is disposed on a side of the base plate 110. The active layer 130 is disposed on a side of the buffer layer 120 facing away from the base plate 110. An orthogonal projection of the active layer 130 on the base plate 110 covers a part of a surface of the base plate 110, and a material of which the active layer 130 is formed may include a low-temperature polysilicon. The gate insulating layer 140 is disposed on a side of the active layer 130 facing away from the buffer layer 120. The gate electrode 150 is disposed on a side of the gate insulating layer 140 facing away from the active layer 130, and an orthogonal projection of the gate electrode 150 on the base plate 110 is located within an orthogonal projection of the active layer 130 on the base plate 110. The interlayer insulating layer 160 is disposed on a side of the gate electrode 150 facing away from the gate insulating layer 140. The source and drain electrode layer 700 is disposed on a side of the interlayer insulating layer 160 facing away from the gate electrode 150, and the source and drain electrode layer 700 is electrically connected to the active layer 130 through a third via hole 30. The touch pad 200 is disposed in a same layer as the source and drain electrode layer 700 (referring to FIG. 6), or the touch pad 200 is disposed on a side of the source and drain electrode layer 700 facing away from the interlayer insulating layer 160 (referring to FIG. 7). Thereby, the service performance of the array substrate 1000 is further improved.

In another aspect of the present disclosure, embodiments of the present disclosure provide a method of manufacturing an array substrate. According to embodiments of the present disclosure, the array substrate manufactured by the method may be the above array substrate. Therefore, the array substrate manufactured by the method has all of the features and advantages of the above array substrate, which are no longer described herein for the sake of brevity.

Figure 8:
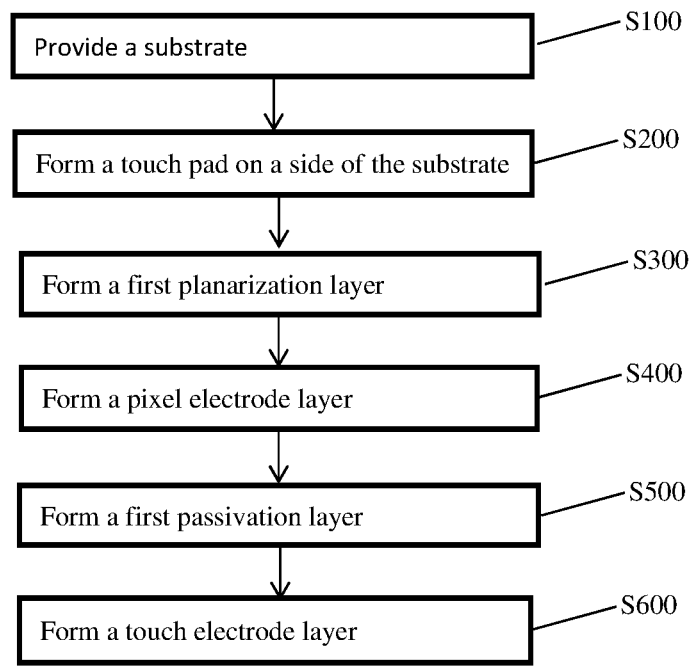
FIG. 8 is a flow diagram of a method of manufacturing an array substrate according to an embodiment of the present disclosure.

According to embodiments of the present disclosure, referring to FIG. 8, the method includes the following steps.

In a step S100, a substrate is provided.

In the step S100, the substrate is provided. According to embodiments of the present disclosure, the specific type of the substrate is not particularly limited. For example, the substrate may be the same as described above. The substrate may include a multilayer structure. For example, the substrate 100 may include: a base plate, a buffer layer, an active layer, a gate insulating layer, a gate electrode, an interlayer insulating layer, and the like, which are stacked in sequence.

In a step S200, a touch pad is formed on a side of the substrate.

In the step S200, the touch pad is formed on the side of the substrate. According to embodiments of the present disclosure, as described above, the touch pad may be disposed in a same layer as the source and drain electrode layer, or the touch pad may also be separately disposed in a layer. Specifically, when the touch pad is disposed in the same layer as the source and drain electrode layer, a metal may be deposited on a side of the substrate, and then the deposited metal is patterned by a patterning process to form the touch pad, the data line, the source and drain electrode pad, and the like, respectively. Specifically, the touch pad may be formed in a non-display area on the substrate.

In a step S300, a first planarization layer is formed.

In the step S300, a first planarization layer is formed on a side of the touch pad facing away from the substrate. According to embodiments of the present disclosure, in the array substrate manufactured by the method, the touch electrode layer manufactured in the following step and the touch pad manufactured in the above step need to be electrically connected to each other through the first via hole. The first via hole includes a first hole passing through the first planarization layer, a second hole passing through the pixel electrode layer, and a third hole passing through the first passivation layer, which are arranged in sequence. Further, the pixel electrode layer manufactured in the following step and the source and drain electrode pad need to be electrically connected to each other through the second via hole. When the source and drain electrode pad and the touch pad are disposed in the same layer, the second via hole passes through the first planarization layer. Therefore, when the first planarization layer is formed in the step, the first hole and the second via hole need to be formed in the first planarization layer. Specifically, the first planarization layer may be formed of an organic material. For example, the first planarization layer may be formed of acrylic resin. Specifically, firstly a planarization resin may be applied on the side of the touch pad facing away from the substrate, and the applied planarization resin is exposed by means of a mask. An orthogonal projection of the mask on the substrate may be located within orthogonal projections of the touch pad and the source and drain electrode pad on the substrate. Then, a portion of the planarization resin not covered by the mask is removed to form the first hole and the second via hole, so that the first planarization layer with the first hole and the second via hole can be formed on a side of the touch pad and the source and drain electrode layer facing away from the substrate. Thereby, the first hole and the second via hole passing through the first planarization layer can be simply and conveniently formed in the first planarization layer, facilitating an electrical connection between the touch electrode layer manufactured later and the touch pad, and an electrical connection between the pixel electrode layer manufactured later and the source and drain electrode pad.

In a step S400, the pixel electrode layer is formed.

In the step S400, the pixel electrode layer is formed on a side, facing away from the touch pad, of the first planarization layer manufactured in the above step. According to embodiments of the present disclosure, an electrode material such as ITO may be deposited on the side of the first planarization layer facing away from the touch pad, and then the deposited electrode material is patterned by a patterning process to form a plurality of sub-pixel electrodes arranged in an array. When the array substrate manufactured by the method is used in the display panel later, the plurality of sub-pixel electrodes can control deflections of liquid crystal molecules in the plurality of sub-pixel regions, respectively. Specifically, as described above, the touch electrode layer manufactured in the following step and the touch pad manufactured in the above step need to be electrically connected to each other through the first via hole. The first via hole includes a first hole passing through the first planarization layer, a second hole passing through the pixel electrode layer, and a third hole passing through the first passivation layer, which are arranged in sequence. Therefore, when the pixel electrode layer is formed in the step, the second hole passing through pixel electrode layer may be formed in a portion of the pixel electrode layer corresponding in position to the first hole formed in the above step.

In a step S500, the first passivation layer is formed.

In the step S500, the first passivation layer is formed on a side of the first planarization layer facing away from the pixel electrode layer. According to embodiments of the present disclosure, the first passivation layer may be formed of an organic material such as silicon nitride. As described above, the touch electrode layer manufactured in the following step and the touch pad manufactured in the above step need to be electrically connected to each other through the first via hole. The first via hole includes a first hole passing through the first planarization layer, a second hole passing through the pixel electrode layer, and a third hole passing through the first passivation layer, which are arranged in sequence. Therefore, when the first passivation layer is formed in the step, the third hole passing through the first passivation layer needs to be formed in the first passivation layer. Specifically, a first passivation layer material such as silicon nitride may be deposited on the side of the pixel electrode layer facing away from the first planarization layer. Then, a photoresist is applied on a surface of the first passivation layer material facing away from the first planarization layer, and the applied photoresist is exposed to form a patterned photoresist layer. The photoresist layer has a hollowed-out region, and an orthogonal projection of the hollowed-out region on the substrate is located within an orthogonal projection of the first hole on the substrate. After that, a first dry etching process is performed on a portion of the first passivation layer material corresponding in position to the hollowed-out region to form the third hole in the first passivation layer material. Finally, the photoresist layer is stripped. Thereby, the first passivation layer with the third hole passing therethrough can be simply and conveniently formed, facilitating an electrical connection between the touch electrode layer manufactured later and the touch pad. According to an example of the present disclosure, the step S500 includes: subsequent to forming the first planarization layer with the first hole and the pixel electrode layer with the second hole, depositing a first passivation layer material on a side of the pixel electrode layer facing away from the first planarization layer, and performing a first dry etching process on the first passivation layer material to form the third hole in the first passivation layer material. While performing the first dry etching process on the first passivation layer material, etching a portion, corresponding in position to the third hole, of a surface of the touch pad facing away from the substrate so as to remove an oxide layer of the portion of the surface of the touch pad.

According to embodiments of the present disclosure, while performing the first dry etching process on the portion of the first passivation layer material corresponding in position to the hollowed-out region, a portion, corresponding in position to the third hole, of a surface of the touch pad facing away from the substrate can be etched with the etching gas so as to remove an oxide layer of the portion of the surface of the touch pad. Thereby, while the third hole is formed by etching in the method, the oxide layer of the portion, corresponding in position to the third hole, of the surface of the touch pad facing away from the substrate can be removed. Thus, the contact resistance between the touch electrode and the touch pad can be reduced without increasing the production steps. The service performance of the manufactured array substrate is further improved.

Specifically, the first dry etching process may be performed in a mixed gas of sulfur hexafluoride and oxygen. A flow rate of the sulfur hexafluoride gas may be 500 sccm to 700 sccm, for example, 600 sccm, and a flow rate of the oxygen gas may be 1100 sccm to 1300 sccm, for example, 1200 sccm. A period of time for which the first dry etching process is performed may be 12 s to 25 s, for example, 15 s, 20 s, or the like. Thereby, under the above etching conditions, not only the third hole can be better formed by etching in the first passivation layer, but the oxide layer of the portion, corresponding in position to the third hole, of the surface of the touch pad facing away from the substrate can also be removed. Thus, the contact resistance between the touch electrode and the touch pad can be reduced without increasing the production steps. The service performance of the manufactured array substrate is further improved.

In a step S600, a touch electrode layer is formed.

In the step, the touch electrode layer is formed on a side, facing away from the pixel electrode layer, of the first passivation layer manufactured in the above step. According to embodiments of the present disclosure, an electrode material may be deposited on the side of the first passivation layer facing away from the pixel electrode layer, and the deposited electrode material is pattern to form a plurality of touch electrodes arranged in an array. Orthogonal projections of the touch electrodes on the substrate may at most partially coincide with orthogonal projections, on the substrate, of the sub-pixel electrodes formed in the above step. In other words, the orthogonal projections of the touch electrodes on the substrate and the orthogonal projections of the sub-pixel electrodes on the substrate partially coincide with each other or do not coincide with each other at all. In other words, the orthogonal projections of the touch electrodes on the substrate partially coincide with the orthogonal projections of the sub-pixel electrodes on the substrate, or the orthogonal projections of the touch electrodes on the substrate are outside the orthogonal projections of the sub-pixel electrodes on the substrate. As described above, the pixel electrode layer manufactured by the method is disposed on the side of the touch electrode layer facing towards the substrate. When the array substrate is used in a display panel, liquid crystal molecules are disposed on a side of the touch electrode layer facing away from the substrate. Therefore, in order that the pixel electrode layer can control deflections of liquid crystal molecules better, slits are formed in the touch electrode layer. In other words, the touch electrode layer may include a plurality of touch electrodes arranged in an array. Thereby, there is a small area of overlap between orthographic projections, on the substrate, of the touch electrode layer and the pixel electrode layer manufactured by the method. When the array substrate is used for a touch display panel, the aperture ratio, the light transmittance, and the display performance of the touch display panel can be improved.

Figure 9:
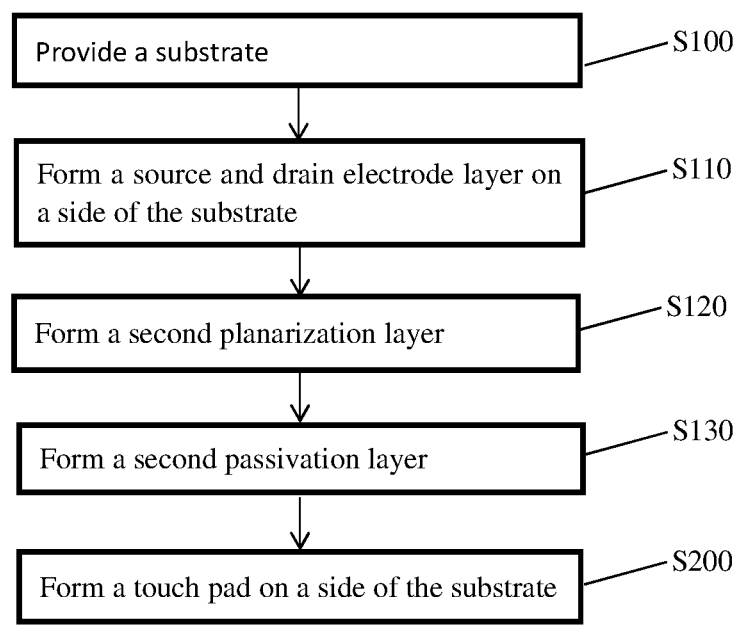
FIG. 9 is a flow diagram of a method of manufacturing an array substrate according to another embodiment of the present disclosure.

According to embodiments of the present disclosure, as described above, the source and drain electrode layer may be disposed in a same layer as the touch pad, or may also be separately disposed in a layer. When the source and drain electrode layer is separately disposed in a layer, referring to FIG. 9, the method may further include the following steps prior to forming the touch pad.

In a step S110, a source and drain electrode layer is formed on a side of the substrate.

In the step S110, the source and drain electrode layer is formed on the side of the substrate. According to embodiments of the present disclosure, the source and drain electrode layer may include a data line and a source and drain electrode pad. Specifically, a metal may be deposited on the side of the substrate, and then the deposited metal is etched by a patterning process to form the source and drain electrode layer.

In a step S120, a second planarization layer is formed.

In the step S120, a second planarization layer is formed on a side, facing away from the substrate, of the source and drain electrode layer formed in the above step. According to embodiments of the present disclosure, in the array substrate manufactured by the method, the pixel electrode layer manufactured in the following step and the source and drain electrode pad need to be electrically connected to each other through a second via hole. The second via hole includes: a fourth hole passing through the second planarization layer, a fifth hole passing through the second passivation layer, and a sixth hole passing through the first planarization layer, which are arranged in sequence. Therefore, when the second planarization layer is formed in the step, the fourth hole needs to be formed in the second planarization layer. Specifically, a material for forming the second planarization layer and a method for forming the fourth hole may be the same as the material for forming the first planarization layer and the method for forming the first hole described above, respectively, and are no longer described herein for the sake of brevity. For example, the fourth hole passing through the second planarization layer may be formed in the second planarization layer by means of a mask.

In a step S130, a second passivation layer is formed.

In the step S130, the second passivation layer is formed on a side of the second planarization layer facing away from the substrate. According to embodiments of the present disclosure, a material, a method and the like for forming the second passivation layer may be the same as the material, the method, and the like for forming the first passivation layer described above. As described above, in the array substrate manufactured by the method, the pixel electrode layer manufactured in the following step and the source and drain electrode pad need to be electrically connected to each other through the second via hole. The second via hole includes: the fourth hole passing through the second planarization layer, the fifth hole passing through the second passivation layer, and the sixth hole passing through the first planarization layer, which are arranged in sequence. Specifically, a second passivation layer material may be deposited on the side of the second planarization layer facing away from the substrate, and then, a second dry etching process is performed on the second passivation layer material to form the fifth hole passing through the second passivation layer material. Likewise, an etching gas of the second dry etching process may simultaneously etch a portion, corresponding in position to the fifth hole, of a surface of the source and drain electrode pad facing away from the substrate so as to remove an oxide layer of the portion of the surface of the source and drain electrode pad. Thereby, while the fifth hole is formed by the method, the oxide layer of the portion, corresponding in position to the fifth hole, of the surface of the source and drain electrode pad facing away from the substrate can be removed. Thus, the contact resistance between the pixel electrode and the source and drain electrode pad can be reduced, and the displaying effect of the touch display panel with the array substrate manufactured by the method is further improved.

According to embodiments of the present disclosure, in the step S130, when the fifth hole is formed in the second passivation layer, the fifth hole may not be formed by the special second dry etching process if the fifth hole is located in the display area. In other words, in the step, the entire second passivation layer may be formed directly, and the fifth hole in the second passivation layer and the third hole in the first passivation layer described above may be formed by a single dry etching process, thereby saving the production process. Specifically, when the fifth hole in the second passivation layer and the third hole in the first passivation layer described above are formed by the single dry etching process, a transition pad may be disposed in the same layer as the touch pad. The source and drain electrode pad may be electrically connected to the transition pad through the fourth hole passing through the second planarization layer. The transition pad is electrically connected to the pixel electrode layer through the fifth hole passing through the second passivation layer and the sixth hole passing through the first planarization layer. The fifth hole is formed by a following etching process. Thereby, an electrical connection between the source and drain electrode pad and the pixel electrode layer can also be achieved. Specifically, when the source and drain electrode pad and the pixel electrode layer are electrically connected to each other through the transition pad, the fourth hole between the source and drain electrode pad and the transition pad, and the fifth hold and the sixth hole between the source and drain electrode pad and the pixel electrode layer may be staggered holes. Thereby, the third hole and the fifth hole can be formed by a single etching process with no influence on the electric connection between the pixel electrode layer and the source and drain electrode pad. According to embodiments of the present disclosure, after the second passivation layer is formed, the touch pad may be formed on the side of the second passivation layer facing away from the second planarization layer. The touch pad is separately disposed in a layer. Structures such as the first planarization layer, the pixel electrode layer, the first passivation layer and the touch electrode layer may be formed on a side of the touch pad facing away from the second passivation layer in sequence later, which is no longer described herein for the sake of brevity.

As described above, the performance of the electric connection between the touch electrode layer and the touch pad manufactured by the method is good, and the contact resistance between the touch electrode layer and the touch pad is small, thereby decreasing the poor touch of a touch display panel with the array substrate, and improving the service performance of the touch display panel.

In another aspect of the present disclosure, embodiments of the present disclosure provide a display panel. According to embodiments of the present disclosure, the display panel includes: the above array substrate, or the array substrate manufactured by the above method. Thereby, the display panel has all of the features and advantages of the above array substrate or the array substrate manufactured by the above method, which are no longer described herein for the sake of brevity. In general, the display panel has good touch and display performance.

In still another aspect of the present disclosure, embodiments of the present disclosure provide a display apparatus. According to embodiments of the present disclosure, the display apparatus includes the above display panel. Thereby, the display apparatus has all of the features and advantages of the above display panel, which are no longer described herein for the sake of brevity. In general, the display apparatus has good touch and display performance.

The display apparatus may include any products or parts having a displaying function, such as a mobile phone, a tablet computer, a TV, a display, a notebook computer, a digital frame, and a navigator.

In the description of the present specification, the description with reference to the term "an embodiment", "another embodiment", or the like means that a specific feature, structure, material or characteristic described in conjunction with the embodiment is included in at least one embodiment of the present disclosure. In the present specification, the illustrative references to the above terms are not necessarily directed to the same embodiment or example. Furthermore the described specific features, structures, materials or characteristics may be combined in appropriate manners in any one or more embodiments or examples. In addition, those skilled in the art could combine the different embodiments or examples and the features of the different embodiments or examples described in the description unless they conflict. In addition, it is to be noted that in the description, the terms "first", "second", "third", "fourth", "fifth" and "sixth" are used for only descriptive purposes and should not to be construed as indicating or implying a relative importance or implicitly indicating the numbers of technical features indicated by them.

While the embodiments of the present disclosure have been shown and described above, it will be appreciated that the above embodiments are illustrative and should not be construed as limiting the prevent disclosure. Those skilled in the art may make changes, modifications, substitutions and alterations to the above embodiments within the scope of the present disclosure.

What is claimed is:

1. An array substrate comprising:
  a substrate;
  a touch pad disposed on a side of the substrate;
  a first planarization layer disposed on a side of the touch pad facing away from the substrate;
  a first passivation layer disposed on a side of the first planarization layer facing away from the touch pad;
  a touch electrode layer disposed on a side of the first passivation layer facing away from the first planarization layer;

a first via hole sequentially passing through at least the first planarization layer and the first passivation layer; and a pixel electrode layer disposed between the first planarization layer and the first passivation layer, and comprising a plurality of sub-pixel electrodes arranged in an array, the first via hole sequentially passing through the first planarization layer, the pixel electrode layer, and the first passivation layer, wherein the touch electrode layer is electrically connected to the touch pad through the first via hole, and wherein the touch electrode layer comprises a plurality of touch electrodes arranged in an array, and orthogonal projections of the touch electrodes on the substrate at most partially coincide with orthogonal projections of the sub-pixel electrodes on the substrate.

2. The array substrate of claim 1, further comprising:
a source and drain electrode layer disposed in a same layer as the touch pad and comprising a source electrode and a drain electrode;
a second via hole passing through the first planarization layer; and
a pixel electrode layer disposed between the first planarization layer and the first passivation layer, and electrically connected to the source electrode and the drain electrode of the source and drain electrode layer through the second via hole.

3. The array substrate of claim 1, further comprising:
a source and drain electrode layer disposed on the side of the substrate;
a second planarization layer disposed on a side of the source and drain electrode layer facing away from the substrate; and
a second passivation layer disposed on a side of the second planarization layer facing away from the source and drain electrode layer,
wherein the touch pad is disposed on a side of the second passivation layer facing away from the second planarization layer.

4. The array substrate of claim 3, further comprising:
a second via hole sequentially passing through the second planarization layer, the second passivation layer, and the first planarization layer; and
a pixel electrode layer disposed between the first planarization layer and the first passivation layer,
wherein the source and drain electrode layer comprises a source electrode and a drain electrode, and the pixel electrode layer is electrically connected to the source electrode and the drain electrode of the source and drain electrode layer through the second via hole.

5. The array substrate of claim 1, wherein:
the substrate comprises:
a base plate;
a buffer layer disposed on a side of the base plate;
an active layer disposed on a side of the buffer layer facing away from the base plate, wherein an orthogonal projection of the active layer on the base plate covers a part of a surface of the base plate, and a material of which the active layer is formed comprises a low-temperature polysilicon;
a gate insulating layer disposed on a side of the active layer facing away from the buffer layer;
a gate electrode disposed on a side of the gate insulating layer facing away from the active layer, wherein an orthogonal projection of the gate electrode on the base plate is located within an orthogonal projection of the active layer on the base plate; and an interlayer insulating layer disposed on a side of the gate electrode facing away from the gate insulating layer, and
the array substrate further comprises:
a source and drain electrode layer disposed on a side of the interlayer insulating layer facing away from the gate electrode, wherein the source and drain electrode layer is electrically connected to the active layer through a third via hole.

6. The array substrate of claim 5, wherein:
the touch pad is disposed in a same layer as the source and drain electrode layer, or the touch pad is disposed on a side of the source and drain electrode layer facing away from the interlayer insulating layer.

7. The array substrate of claim 1, wherein:
the first planarization layer comprises an organic material layer, and the first passivation layer comprises an inorganic material layer.

8. The array substrate of claim 1, wherein:
the touch pad has a recess on a surface of the touch pad facing towards the touch electrode layer, and during forming a portion, in the first passivation layer, of the first via hole by a dry etching process, the recess is formed by etching a portion, corresponding in position to the first via hole, of the surface of the touch pad by means of an etching gas, and
at least a portion of an orthogonal projection of the recess on the substrate is located within an orthogonal projection of the first via hole on the substrate.

9. A display panel comprising the array substrate of claim 1.

10. A display apparatus comprising the display panel of claim 9.

11. A method of manufacturing an array substrate, the method comprising:
providing a substrate;
forming a touch pad on a side of the substrate;
forming a first planarization layer on a side of the touch pad facing away from the substrate;
forming a first passivation layer on a side of the first planarization layer facing away from the touch pad;
forming a touch electrode layer on a side of the first passivation layer facing away from the first planarization layer; and
forming a pixel electrode layer subsequent to forming the first planarization layer on the side of the touch pad and prior to forming the first passivation layer on the side of the first planarization layer,
wherein the touch electrode layer is electrically connected to the touch pad through a first via hole passing through at least the first planarization layer and the first passivation layer, and
wherein the first via hole comprises a first hole passing through the first planarization layer, a second hole passing through the pixel electrode layer, and a third hole passing through the first passivation layer, which are arranged in sequence.

12. The method of claim 11, wherein forming the first passivation layer on the side of the first planarization layer comprises:
subsequent to forming the first planarization layer with the first hole and the pixel electrode layer with the second hole, depositing a first passivation layer material on a side of the pixel electrode layer facing away from the first planarization layer, and performing a first dry etching process on the first passivation layer material to form the third hole in the first passivation layer material; and while performing the first dry etching process on the first passivation layer material, etching a portion, corresponding in position to the third hole, of a surface of the touch pad facing away from the substrate so as to remove an oxide layer of the portion of the surface of the touch pad.

13. The method of claim 11, wherein forming the first planarization layer on the side of the touch pad comprises:

applying a planarization resin on the side of the touch pad facing away from the substrate;

exposing, by means of a mask, the planarization resin to cure the planarization resin, an orthogonal projection of the mask on the substrate being located within an orthogonal projection of the touch pad on the substrate; and removing a portion of the planarization resin not covered by the mask to form the first hole, thereby forming the first planarization layer with the first hole on the side of the touch pad facing away from the substrate.

14. The method of claim 13, wherein forming the first passivation layer on the side of the first planarization layer comprises:

depositing a first passivation layer material on a side of the pixel electrode layer facing away from the first planarization layer;

applying a photoresist on a surface of the first passivation layer material facing away from the first planarization layer, and exposing the photoresist to form a patterned photoresist layer, the photoresist layer having a hollowed-out region, and an orthogonal projection of the hollowed-out region on the substrate being located within an orthogonal projection of the first hole on the substrate;

performing a first dry etching process on a portion of the first passivation layer material corresponding in position to the hollowed-out region to form the third hole in the first passivation layer material; and stripping the photoresist layer.

15. The method of claim 14, wherein:

while performing the first dry etching process on the portion of the first passivation layer material corresponding in position to the hollowed-out region, a portion, corresponding in position to the third hole, of a surface of the touch pad facing away from the substrate is etched with an etching gas so as to remove an oxide layer of the portion of the surface of the touch pad.

16. The method of claim 15, further comprising:

forming a source and drain electrode layer while forming the touch pad on the side of the substrate, the source and drain electrode layer being disposed in a same layer as the touch pad and comprising a source electrode and a drain electrode, wherein the orthogonal projection of the mask on the substrate is located within an orthogonal projection constituted by both the orthogonal projection of the touch pad on the substrate and an orthogonal projection of the source electrode and the drain electrode on the substrate; and wherein a second via hole is formed while removing the portion of the planarization resin not covered by the mask to form the first hole, thereby forming the first planarization layer with the first hole and the second via hole on the side of the touch pad facing away from the substrate, wherein the pixel electrode layer is electrically connected to the source electrode and the drain electrode pad of the source and drain electrode layer through the second via hole.

17. The method of claim 15, further comprising, prior to forming the touch pad:

forming, on the side of the substrate, a source and drain electrode layer comprising a source electrode and a drain electrode;

forming a second planarization layer on a side of the source and drain electrode layer facing away from the substrate; and forming a second passivation layer on a side of the second planarization layer facing away from the substrate, wherein the touch pad is formed on a side of the second passivation layer facing away from the second planarization layer, wherein the pixel electrode layer is electrically connected to the source electrode and the drain electrode of the source and drain electrode layer through a second via hole, the second via hole comprising: a fourth hole passing through the second planarization layer, a fifth hole passing through the second passivation layer, and a sixth hole passing through the first planarization layer, which are arranged in sequence, and wherein the fifth hole is formed by performing a second dry etching process on a second passivation layer material deposited on the side of the second planarization layer facing away from the source and drain electrode layer, and meanwhile a portion, corresponding in position to the fifth hole, of a surface of the source electrode and the drain electrode facing away from the substrate is etched with an etching gas of the second dry etching process so as to remove an oxide layer of the portion of the surface of the source electrode and the drain electrode.

18. The method of claim 11, further comprising:

forming a pixel electrode layer subsequent to forming the first planarization layer on the side of the touch pad and prior to forming the first passivation layer on the side of the first planarization layer, wherein the formed pixel electrode layer comprises a plurality of sub-pixel electrodes arranged in an array, wherein forming the touch electrode layer on the side of the first passivation layer comprises:

depositing an electrode material on the side of the first passivation layer facing away from the pixel electrode layer, and patterning the deposited electrode material to form a plurality of touch electrodes arranged in an array, wherein orthogonal projections of the touch electrodes on the substrate at most partially coincide with orthogonal projections of the sub-pixel electrodes on the substrate.

* * * * *